(12) United States Patent
Leppanen et al.

(10) Patent No.: US 9,443,202 B2
(45) Date of Patent: Sep. 13, 2016

(54) ADAPTATION OF CONTEXT MODELS

(75) Inventors: Jussi Leppanen, Tampere (FI);
Rajasekaran Andiappan, Tampere (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 520 days.

(21) Appl. No.: 13/814,135

(22) PCT Filed: Jul. 1, 2010

(86) PCT No.: PCT/FI2010/050568
§ 371 (c)(1),
(2), (4) Date: May 29, 2013

(87) PCT Pub. No.: WO2012/001215
PCT Pub. Date: Jan. 5, 2012

(65) Prior Publication Data
US 2013/0238535 A1    Sep. 12, 2013

(51) Int. Cl.
*G06N 99/00*    (2010.01)
*H04W 4/02*    (2009.01)
*H04L 29/08*    (2006.01)
*H04W 4/00*    (2009.01)

(52) U.S. Cl.
CPC ............. *G06N 99/005* (2013.01); *H04L 67/12* (2013.01); *H04W 4/025* (2013.01); *H04W 4/006* (2013.01)

(58) Field of Classification Search
None
See application file for complete search history.

(56) References Cited

U.S. PATENT DOCUMENTS

| | | | |
|---|---|---|---|
| 2002/0054174 A1* | 5/2002 | Abbott | G06F 1/163 715/863 |
| 2004/0002838 A1* | 1/2004 | Oliver et al. | 703/2 |
| 2007/0100480 A1* | 5/2007 | Sinclair et al. | 700/48 |
| 2007/0112701 A1* | 5/2007 | Chellapilla et al. | 706/15 |
| 2008/0189227 A1* | 8/2008 | Kandregula et al. | 706/10 |
| 2011/0098056 A1* | 4/2011 | Rhoads et al. | 455/456.1 |

OTHER PUBLICATIONS

International Search Report for Application No. PCT/FI2010/050568 dated Apr. 6, 2011.

\* cited by examiner

*Primary Examiner* — Stanley K Hill
*Assistant Examiner* — Mikayla Chubb
(74) *Attorney, Agent, or Firm* — Alston & Bird LLP

(57) ABSTRACT

There is disclosed a method including receiving sensor data extracted from one or more physical sensors, using the extracted sensor data and a context model to perform a first level context determination, and examining the at least one condition. If the examining indicated that the at least one condition was fulfilled, the context model is adapted on the basis of the sensor data, otherwise adaptation data formed on the basis of the sensor data is provided to a second level context determination. A corresponding apparatus and computer program product are also provided.

17 Claims, 10 Drawing Sheets

ADAPTATION OF CONTEXT MODELS

FIELD OF THE INVENTION

Various implementations relate generally to electronic communication device technology and, more particularly, relate to a method and apparatus for providing context model adaptation.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or requests made by the user (e.g., content searching, mapping or routing services, etc.). The services may be provided from a network server or other network device, or even from the mobile terminal such as, for example, a mobile telephone, a mobile navigation system, a mobile computer, a mobile television, a mobile gaming system, etc.

The ability to provide various services to users of mobile terminals can often be enhanced by tailoring services to particular situations or locations of the mobile terminals. Accordingly, various sensors have been incorporated into mobile terminals. Each sensor typically gathers information relating to a particular aspect of the context of a mobile terminal such as location, speed, orientation, and/or the like. The information from a plurality of sensors can then be used to determine device context, which may impact the services provided to the user.

Context is any information that can be used to predict the situation of an entity. The entity might be both the user and the device in an environment. Context awareness relates to a device's ability to be aware of its environment, user action and its own state and adapt its behaviour based on the situation.

The accuracy of context extraction algorithms that try to recognize the user's current environment or activity is not close to 100%. One source of problems relates to the training of the statistical environment or activity models in an external computing environment and later the models are used inside a device.

Although models are often trained on a large set of databases collected from multiple users, the results, when the model is used inside a device has just a mediocre accuracy on average for the users, but there might be large differences in accuracy between users. In addition, for example, if the training database for audio-based environment models does not have any data collected in a certain region (e.g. a geological or a political region), the models will not perform well in that region. For example, the street environments sound different in India compared to street environments in Finland. Such systems might benefit from being able to tune or adapt the models to better fit a specific user and his/her life style.

SUMMARY OF THE INVENTION

A method, apparatus and computer program product are therefore provided to enable the provision of adaptation of context models. In some embodiments, the adaptation may be accomplished by hierarchically examining contexts sensed by using sensor data at different levels, for example at a sensor processor, at a base layer, at a middleware level and/or at an operating system level. In an example embodiment, the adaptation may include using both physical sensor data and virtual sensor data.

According to a first aspect of the invention there is provided a method in an apparatus comprising:
    receiving sensor data extracted from one or more physical sensors;
    using the extracted sensor data and a context model to perform a first level context determination;
    examining at least one condition;
    if the examining indicated that the at least one condition was fulfilled, adapting the context model on the basis of the sensor data, otherwise providing adaptation data formed on the basis of the sensor data to a second level context determination.

According to a second aspect of the invention there is provided an apparatus comprising:
    means for receiving sensor data extracted from one or more physical sensors;
    means for using the extracted sensor data and a context model to perform a first level context determination;
    means for examining at least one condition;
    wherein the apparatus is configured to adapt the context model on the basis of the sensor data if the examining indicated that the at least one condition was fulfilled, otherwise to provide adaptation data formed on the basis of the sensor data to a second level context determination.

According to a third aspect of the invention there is provided an apparatus comprising:
at least one processor
and at least one memory including computer program code
the at least one memory and the computer program code configured to, with
the at least one processor, cause the apparatus at least to
    receive sensor data extracted from one or more physical sensors;
    use the extracted sensor data and a context model to perform a first level context determination;
    examine at least one condition;
    wherein the at least one memory and the computer program code is further configured to adapt the context model on the basis of the sensor data if the examining indicated that the at least one condition was fulfilled, otherwise to provide adaptation data formed on the basis of the sensor data to a second level context determination.

According to a fourth aspect of the invention there is provided a computer program product comprising at least one computer-readable storage medium having computer-executable program code portions stored therein, the computer-executable program code portions comprising program code instructions for:

receiving sensor data extracted from one or more physical sensors;

using the extracted sensor data and a context model to perform a first level context determination;

examining at least one condition was fulfilled;

if the examining indicated that the at least one condition was fulfilled, adapting the context model on the basis of the sensor data, otherwise providing adaptation data formed on the basis of the sensor data to a second level context determination.

According to a fifth aspect of the invention there is provided an apparatus comprising:

a receiver configured for receiving sensor data extracted from one or more physical sensors;

a determining element configured for using the extracted sensor data and a context model to perform a first level context determination;

an examining element configured for examining at least one condition;

wherein the apparatus is configured for adapting the context model on the basis of the sensor data if the examining indicated that the at least one condition was fulfilled, otherwise for providing adaptation data formed on the basis of the sensor data to a second level context determination.

In one example embodiment, a method of providing context model adaptation is provided. The method may include receiving physical sensor data extracted from one or more physical sensors, receiving virtual sensor data extracted from one or more virtual sensors, and performing context determination first at the sensor processor layer. If the sensor processor layer does not produce a context determination which is confident enough, the context determination may be made at the base layer. If the base layer does not produce a context determination which is confident enough, the context determination may be continued at the middleware layer. If the middleware layer does not produce a context determination which is confident enough, the context determination may be continued at an application layer. In some embodiments the context model adaptation may be made after the context determination has proved to be accurate enough. In some embodiments the context determination may include user intervention.

In another example embodiment, a computer program product for providing context model adaptation is provided. The computer program product includes at least one computer-readable storage medium having computer-executable program code instructions stored therein. The computer-executable program code instructions may include program code instructions for receiving physical sensor data extracted from one or more physical sensors, receiving virtual sensor data extracted from one or more virtual sensors, and performing context determination and context model adaptation hierarchically.

In another example embodiment, an apparatus for providing context model adaptation is provided. The apparatus may include at least one processor and at least one memory including computer program code. The at least one memory and the computer program code may be configured to, with the at least one processor, cause the apparatus to perform at least receiving physical sensor data extracted from one or more physical sensors, receiving virtual sensor data extracted from one or more virtual sensors, and performing context determination and context model adaptation hierarchically.

DESCRIPTION OF THE DRAWINGS

In the following the present invention will be disclosed in more detail with reference to the accompanying drawings, which are not necessarily drawn to scale, and wherein.

DETAILED DESCRIPTION OF THE INVENTION

Figure 1:
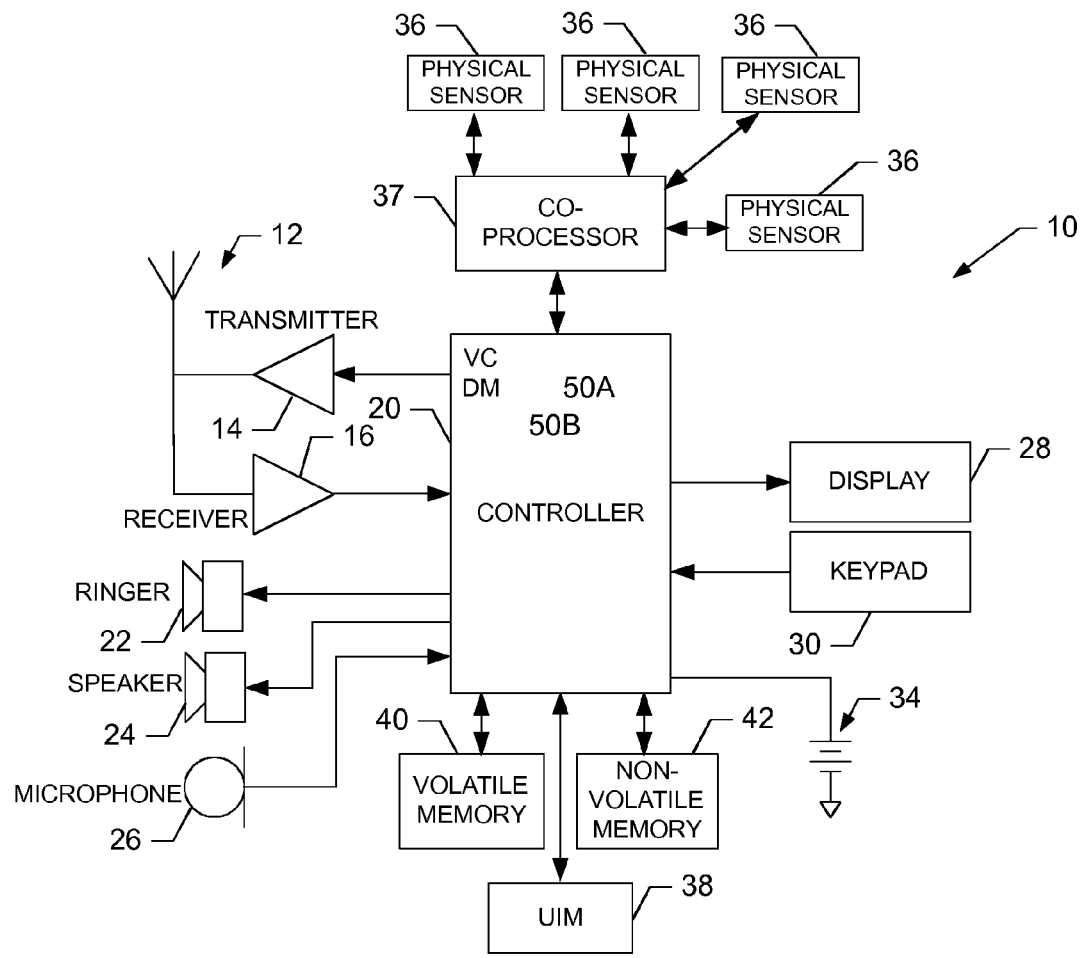
FIG. 1 is a schematic block diagram of a mobile terminal that may employ an example embodiment.

Some embodiments will now be described more fully hereinafter with reference to the accompanying drawings, in which some, but not all embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments. Thus, use of any such terms should not be taken to limit the spirit and scope of various embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a nontransitory, physical storage medium (e.g., volatile or non-volatile memory device), can be differentiated from a "computer-readable transmission medium," which refers to an electromagnetic signal.

Some embodiments may be used to perform sensor integration more efficiently. Since conventional onboard sensors of hand-held devices (e.g., mobile terminals) may typically be interfaced to the main processor of the devices via a communication interface, pre-processing of raw data and detection of events from the sensors may typically be performed in the software driver layer. Some embodiments also provide for a mechanism by which to perform context model adaptation sensing in a hierarchical fashion. In this regard, for example, context information may be determined (or sensed) based on inputs from physical and virtual sensors. After extraction of sensor data (which may define or imply context information) from the physical and/or virtual sensors, context determination may be accomplished on different layers (levels) starting, for example, at the sensor processor layer and ending, if necessary, at the application layer. In some example embodiments, inputs for the context determination are a combination of context information from lower layers and virtual sensor data. As such, the data that is used in determining the context for context model adaptation fused at any particular layer according to example embodiments could either be sensor data (physical and/or virtual) being fused with other sensor data, or sensor data being fused with context information from lower layers (which may itself include sensor data fused with other sensor data and/or context information from lower layers).

Examples of sensor data include audio data, represented e.g. as audio samples or using some encoding such as Adaptive Multi-Rate Wideband or MPEG-1 Audio Layer 3, image data (e.g. represented in Joint Photographic Experts Group JPEG format), accelerometer data (e.g. as values into three orthogonal directions x, y, z), location (e.g. as tuple comprising latitude and longitude), ambient light sensor readings, gyroscope readings, proximity sensor readings, Bluetooth device identifiers, Wireless Local Area Network base station identifiers and signal strengths, cellular communication (such as 2G, 3G, 4G, Long Term Evolution) cellular tower identifiers and their signal strengths, and so on.

FIG. 1, one example embodiment, illustrates a block diagram of a mobile terminal 10 that would benefit from various embodiments. It should be understood, however, that the mobile terminal 10 as illustrated and hereinafter described is merely illustrative of one type of device that may benefit from various embodiments and, therefore, should not be taken to limit the scope of embodiments. As such, numerous types of mobile terminals, such as portable digital assistants (PDAs), mobile telephones, pagers, mobile televisions, gaming devices, laptop computers, cameras, video recorders, audio/video players, radios, positioning devices (for example, global positioning system (GPS) devices), or any combination of the aforementioned, and other types of voice and text communications systems, may readily employ various embodiments.

The mobile terminal 10 may include an antenna 12 (or multiple antennas) in operable communication with a transmitter 14 and a receiver 16. The mobile terminal 10 may further include an apparatus, such as a controller 20 or other processing device, which provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In addition, the mobile terminal 10 may include one or more physical sensors 36. The physical sensors 36 may be devices capable of sensing or determining specific physical parameters descriptive of the current context of the mobile terminal 10. For example, in some cases, the physical sensors 36 may include respective different sending devices for determining mobile terminal environmental-related parameters such as speed, acceleration, heading, orientation, inertial position relative to a starting point, proximity to other devices or objects, lighting conditions and/or the like.

In an example embodiment, the mobile terminal 10 may further include a coprocessor 37. The co-processor 37 may be configured to work with the controller 20 to handle certain processing tasks for the mobile terminal 10. In an example embodiment, the co-processor 37 may be specifically tasked with handling (or assisting with) context model adaptation capabilities for the mobile terminal 10 in order to, for example, interface with or otherwise control the physical sensors 36 and/or to manage the context model adaptation.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), and the like. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10.

Figure 2:
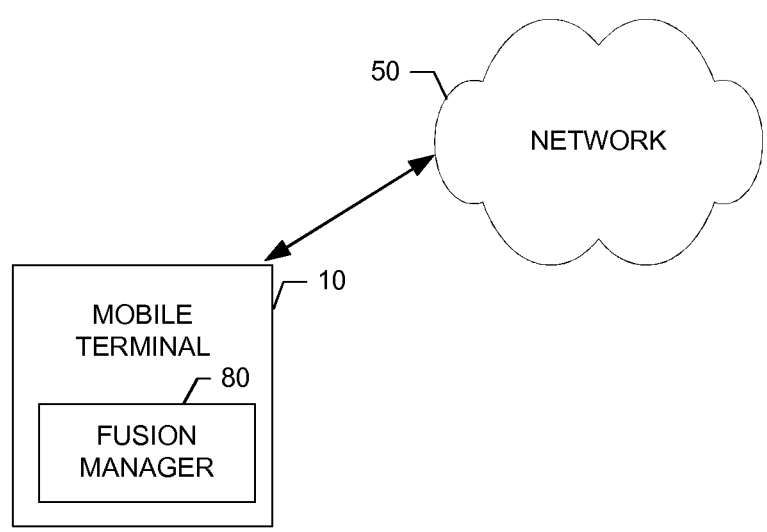
FIG. 2 is a schematic block diagram of a wireless communications system according to an example embodiment.

FIG. 2 is a schematic block diagram of a wireless communications system according to an example embodiment. Referring now to FIG. 2, an illustration of one type of system that would benefit from various embodiments is provided. As shown in FIG. 2, a system in accordance with an example embodiment includes a communication device (for example, mobile terminal 10) and in some cases also additional communication devices that may each be capable of communication with a network 50. The communications devices of the system may be able to communicate with network devices or with each other via the network 50.

In an example embodiment, the network 50 includes a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first generation (1G), second generation (2G), 2.5G, third generation (3G), 3.5G, 3.9G, fourth generation (4G) mobile communication protocols, Long Term Evolution (LTE), and/or the like.

One or more communication terminals such as the mobile terminal 10 and the other communication devices may be capable of communication with each other via the network 50 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (for example, personal computers, server computers or the like) may be coupled to the mobile terminal 10 via the network 50. By directly or indirectly connecting the mobile terminal 10 and other devices to the network 50, the mobile terminal 10 and the other devices may be enabled to communicate with each other and/or the network, for example, according to numerous communication protocols including Hypertext Transfer Protocol (HTTP) and/or the like, to thereby carry out various communication or other functions of the mobile terminal 10 and the other communication devices, respectively.

Furthermore, although not shown in FIG. 2, the mobile terminal 10 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 may be enabled to communicate with the network 50 and other communication devices by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

Figure 3:
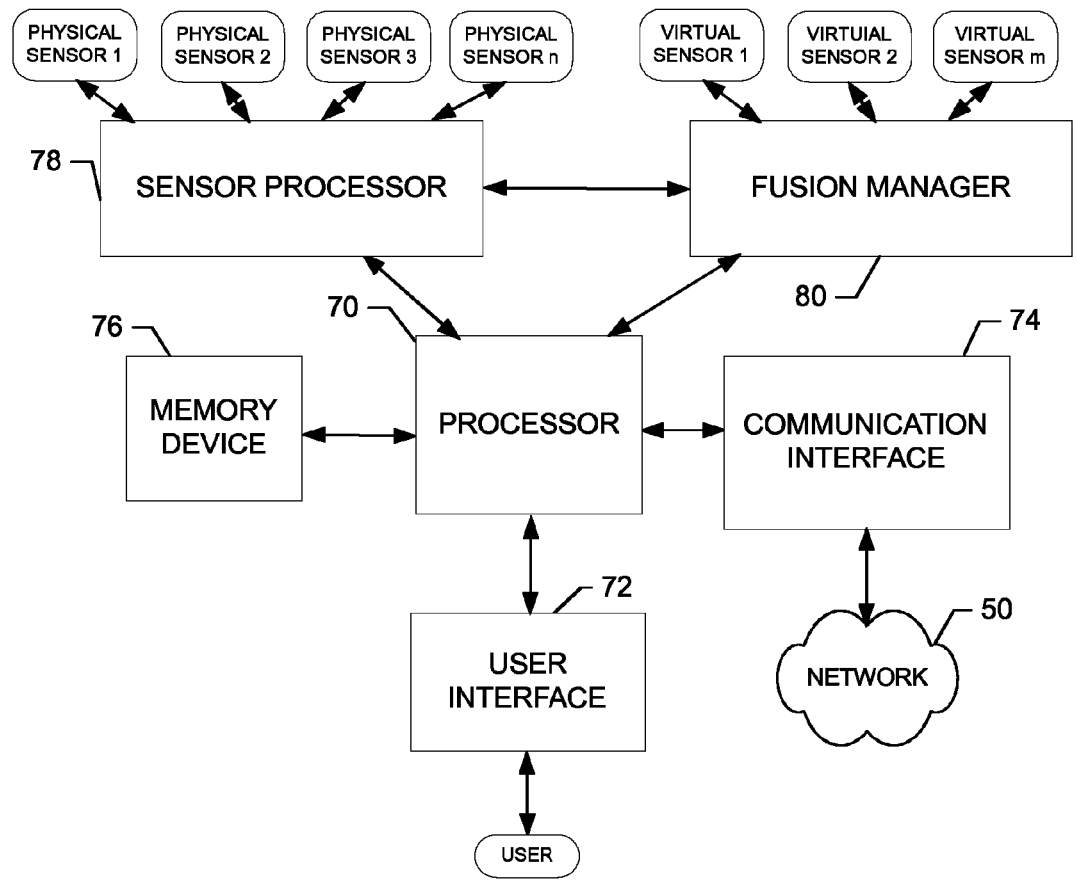
FIG. 3 illustrates a block diagram of an apparatus for providing context determination and context model adaptation according to an example embodiment.

FIG. 3 illustrates a block diagram of an apparatus that may be employed at the mobile terminal 10 to host or otherwise facilitate the operation of an example embodiment. An example embodiment will now be described with reference to FIG. 3, in which certain elements of an apparatus for providing hierarchical context determination (sensing), fusion and context model adaptation are displayed. The apparatus of FIG. 3 may be employed, for example, on the mobile terminal 10. However, the apparatus may alternatively be embodied at a variety of other devices, both mobile and fixed (such as, for example, any of the devices listed above). Furthermore, it should be noted that the devices or elements described below may not be mandatory and thus some may be omitted in certain embodiments.

Referring now to FIG. 3, an apparatus for providing context sensing, fusion and adaptation is provided. The apparatus may include or otherwise be in communication with a processor 70, a user interface 72, a communication interface 74 and a memory device 76. The memory device 76 may include, for example, one or more volatile and/or non-volatile memories. In other words, for example, the memory device 76 may be an electronic storage device (for example, a computer readable storage medium) comprising gates configured to store data (for example, bits) that may be retrievable by a machine (for example, a computing device). The memory device 76 may be configured to store information, data, applications, instructions or the like for enabling the apparatus to carry out various functions in accordance with example embodiments. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a microprocessor, a controller, a digital signal processor (DSP), a processing device with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (for example, the mobile terminal 10 or other communication device) adapted for employing various embodiments by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In an example embodiment in which the apparatus is embodied as a server or some other network devices, the user interface 72 may be limited, or eliminated. However, in an embodiment in which the apparatus is embodied as a communication device (for example, the mobile terminal 10), the user interface 72 may include, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (for example, memory device 76, and/or the like).

In an example embodiment, the apparatus may further include a sensor processor 78. The sensor processor 78 may have similar structure (albeit perhaps with semantic and scale differences) to that of the processor 70 and may have similar capabilities thereto. However, according to an example embodiment, the sensor processor 78 may be configured to interface with one or more physical sensors (for example, physical sensor 1, physical sensor 2, physical sensor 3, . . . , physical sensor n, where n is an integer equal to the number of physical sensors) such as, for example, an accelerometer 501 (FIGS. 5a, 5b), a magnetometer 502, a proximity sensor 503, an ambient light sensor 504, a gyroscope 505, a microphone 26 and/or any of a number of other possible sensors. In some embodiments, the sensor processor 78 may access a portion of the memory device 76 or some other memory to execute instructions stored thereat. Accordingly, for example, the sensor processor 78 may be configured to interface with the physical sensors via sensor specific firmware 140 that is configured to enable the sensor processor 78 to communicate with each respective physical sensor. In some embodiments, the sensor processor 78 may be configured to extract information from the physical sensors (perhaps storing such information in a buffer in some cases), perform sensor control and management functions 135 for the physical sensors and perform sensor data pre-processing 134. In an example embodiment, the sensor processor 78 may also be configured to perform context determination 131 with respect to the physical sensor data extracted. In yet another example embodiment, the sensor processor 78 may also be configured to perform sensor data fusion. The context determination information and, when appropriate, the fused physical sensor data may then be communicated to the processor 70 (for example, in the form of fusion manager 80, which is described in greater detail below) for further processing. In some embodiments, the sensor processor 78 may include a host interface function 110 for managing the interface between the processor 70 and the sensor processor 78 at the sensor processor 78 end. As such, the sensor processor 78 may be enabled to provide data from the physical sensors, status information regarding the physical sensors, control information, queries and context information to the processor 70.

In an example embodiment, the processor 70 may be embodied as, include or otherwise control the fusion manager 80. As such, in some embodiments, the processor 70 may be said to cause, direct or control the execution or occurrence of the various functions attributed to the fusion manager 80 as described herein. The fusion manager 80 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the fusion manager 80 as described herein. Thus, in examples in which software is employed, a device or circuitry (for example, the processor 70 in one example) executing the software forms the structure associated with such means.

The fusion manager 80 may be configured to communicate with the sensor processor 78 (in embodiments that employ the sensor processor 78) to receive context classification data (e.g. one or more labels), preprocessed physical sensor data and/or fused physical sensor data. In embodiments where no sensor processor 78 is employed, the fusion manager 80 may further be configured to pre-process and/or fuse physical sensor data and to provide context classification data. In an example embodiment, the fusion manager 80 may be configured to interface with one or more virtual sensors 520 (for example, virtual sensor 1, virtual sensor 2, . . . , virtual sensor m, where m is an integer equal to the number of virtual sensors) in order to fuse virtual sensor data with physical sensor data. Virtual sensors may include sensors that do not measure physical parameters. Thus, for example, virtual sensors may monitor such virtual parameters as RF activity i.e. the activity of the transmitter 14 or the receiver 16 of the device 10, time, calendar events, device state information, active profiles, alarms, battery state, application data, data from web services, certain location information that is measured based on timing (for example, GPS position) or other non-physical parameters (for example, cell-ID), and/or the like. The virtual sensors may be embodied as hardware or as combinations of hardware and software configured to determine the corresponding non-physical parametric data associated with each respective virtual sensor. In some embodiments, the fusion of virtual sensor data with physical sensor data may be classified into different levels. For example, context fusion may occur at the feature level, which may be accomplished at a base layer, at a decision level, which may correspond to middleware, or in independent applications, which may correspond to an application layer. The fusion manager 80 may be configured to manage context fusion (for example, the fusion of virtual and physical sensor data related to context information) at various ones and combinations of the levels described above.

Thus, according to some example embodiments, context data extraction, context classification/determination and fusion of the context data that has been extracted may be performed by different entities, processors or processes in a distributed fashion or layered/linear way. A set of physical sensors may therefore be interfaced with the sensor processor 78, which is configured to manage physical sensors, pre-processes physical sensor data and extract a first level of context data. In some embodiments, the sensor processor 78 may perform data level context fusion on the physical sensor data. The sensor processor 78 may be configured to use pre-processed data and context from other subsystems that may have some type of physical data source (for example, modem, RF module, AV module, GPS subsystems, etc.) and perform a context fusion. In some embodiments, a second level, and perhaps also subsequent levels, of context fusion may be performed to fuse the physical sensor data with virtual sensor data using the processor 70 (for example, via the fusion manager 80). As such, the fusion manager 80 may fuse virtual sensor data and physical sensor data in the operating system layers of the apparatus.

As the processor 70 itself is a processor running an operating system, the virtual context fusion processes running in the processor 70 (for example, in the form of the fusion manager 80) may have access to the context and physical sensor data from the sensor processor 78. The processor 70 may also have access to other subsystems with physical data sources and the virtual sensors. Thus, a layered or distributed context sensing process may be provided.

Figure 4:
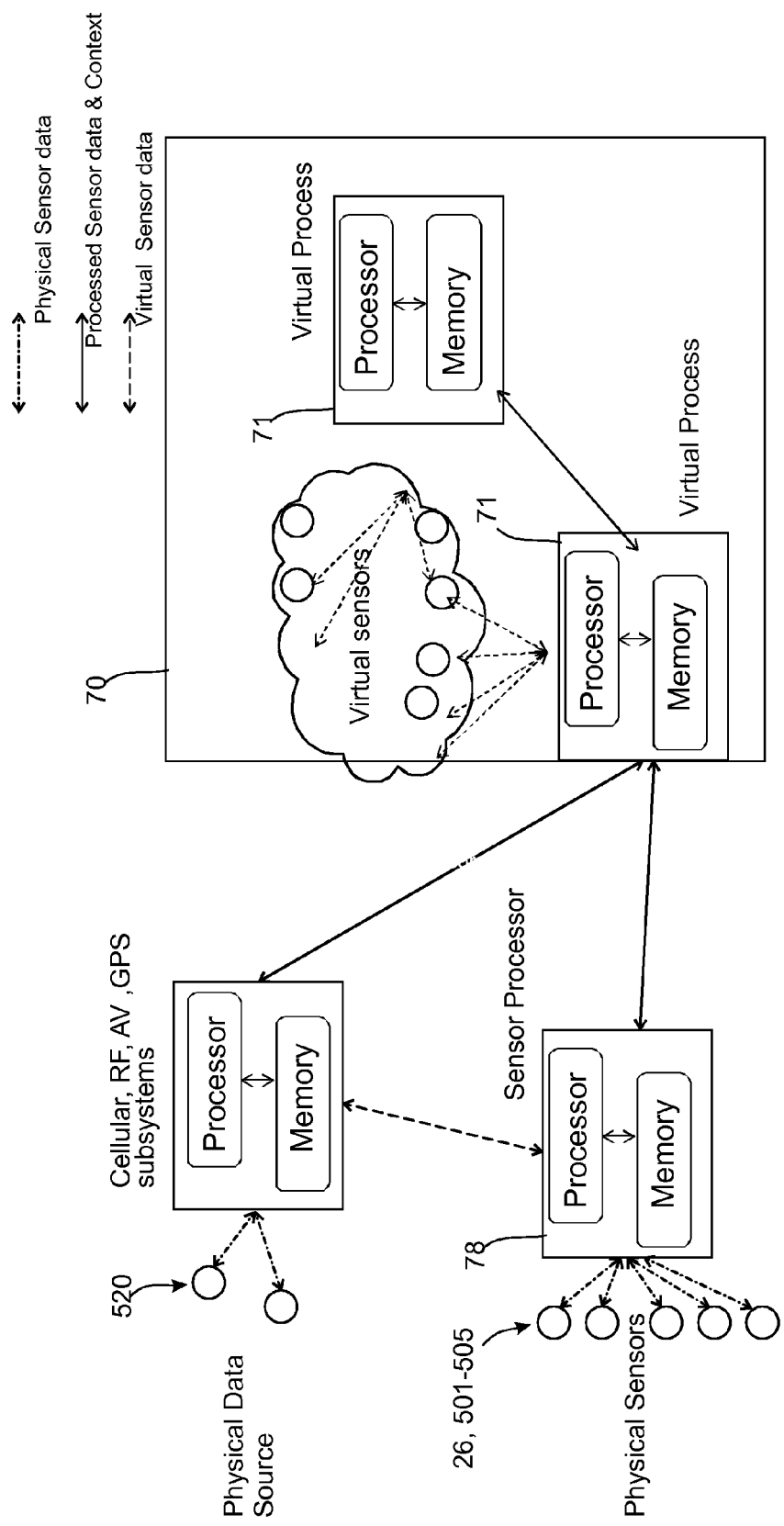
FIG. 4 illustrates a conceptual block diagram of the distributed context model adaptation process provided by an example embodiment.

FIG. 4 illustrates a conceptual block diagram of the distributed sensing and adaptation process provided by an example embodiment. As shown in FIG. 4, each context fusion process running in different layers of the operating system of the processor 70 may add more information to the context and increases a context confidence index. Accordingly, by increasing the context confidence index, more reliable context information may ultimately be generated for use in connection with providing services to the user. In this regard, for example, the sensor processor 78 may perform context sensing and fusion on the physical sensor data received thereat in a first level of context fusion at the hardware layer. A second level of context fusion may then take place at the processor 70 (for example, via the fusion manager 80) by fusing the physical sensor data with some virtual sensor data at the feature level corresponding to the base layer. A third level of context fusion may then take place at the processor by fusing the context data fused at the feature level with additional virtual sensor data. The third level of context fusion may occur at the decision level and add to the context confidence index. Accordingly, when the context information is provided to an independent application at the application layer, a higher confidence may be placed in the context data used by the independent application. It should be appreciated that the example of FIG. 4 can be scaled to any number of operating system layers. Thus, in some example embodiments, context fusion processes may be run in any operating system layers such that the number of context fusion processes is not limited to three as shown in FIG. 4. It should also be appreciated that the independent application may perform yet another (for example, a fourth level) of context sensing and fusion. Moreover, as is shown in FIG. 4, the independent application may have access to both level 2 and level 3 context information. Thus, the independent application may be enabled to perform context fusion involving context information from multiple preceding levels or even selectively incorporate context information from specific desired ones of the preceding levels in some embodiments.

Figure 5A:
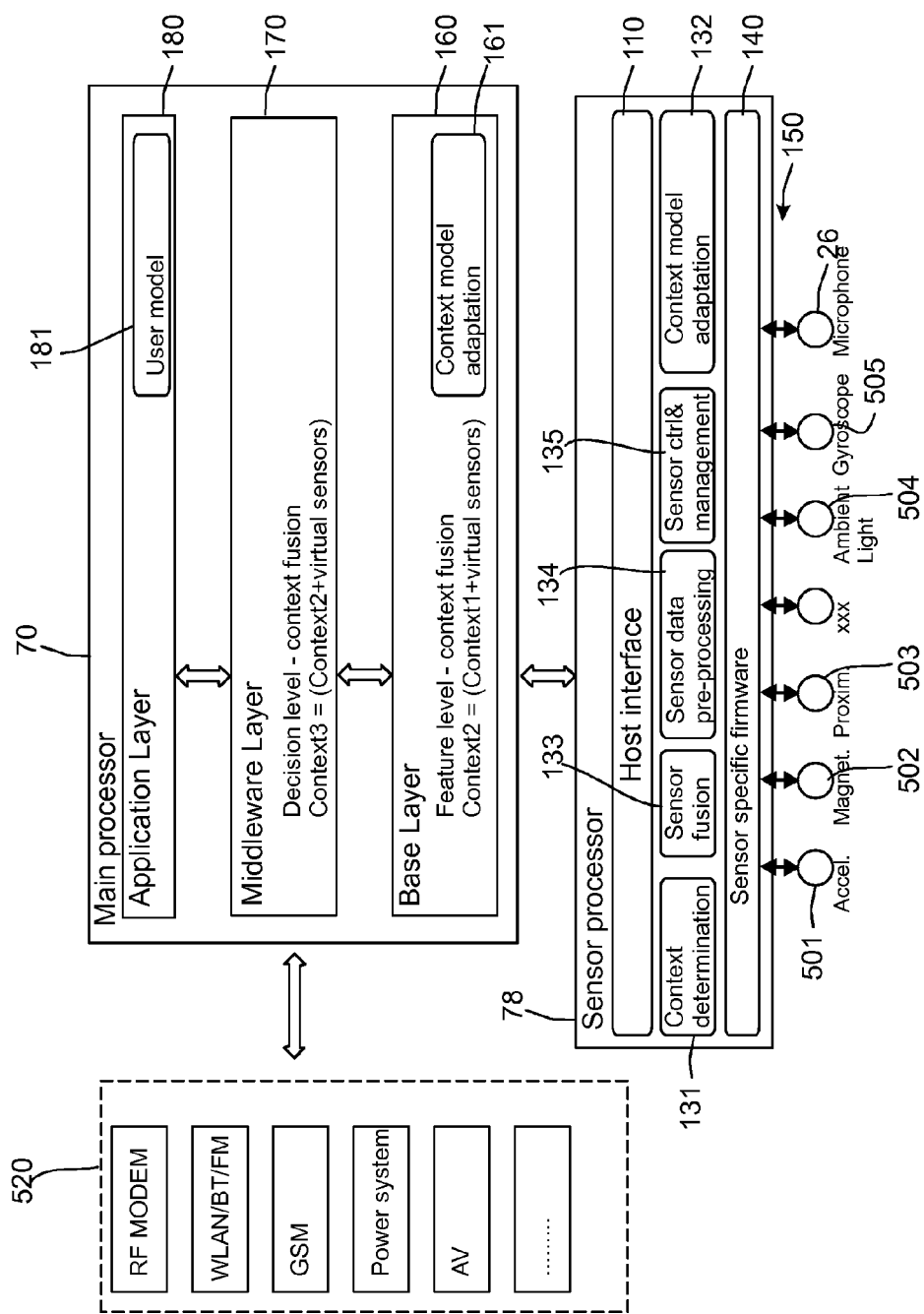
FIG. 5a illustrates an implementation architecture for providing context determination and context model adaptation according to an example embodiment.

FIG. 5a illustrates an implementation architecture according to a non-limiting example. As such, it should be appreciated that the implementation architecture employed may be different in respective different example embodiments. For example, instead of audio data being interfaced into the sensor processor 78 (shown in FIG. 5a by virtue of the microphone 26 being provided as an input to the sensor processor 78), the audio data could instead be interfaced directly to the processor 70. In this regard, in FIG. 5a, all of the physical sensors 501-505 and a microphone 26 are interfaced to the sensor processor 78. Level 1 or data level context extraction and fusion may then be performed in the sensor processor 78 and the context data that results may be communicated to the processor 70 (for example, when requested or when a change of event occurs). Data corresponding to Context$_1$ may therefore be defined as a set of fused context data derived from a set of context data sensed by the physical sensors. Level 2 context fusion may then occur in the base layer (for example, feature level fusion) which involves the basic context generated during level 1 context fusion and virtual sensor data from one or more virtual sensors to create more reliable context information with a time stamp. As such, Context$_2$ may be formed from the fusion of Context$_1$ with virtual sensor data or contexts fused with context information from the audio based context sensing. The middleware may then perform level 3 context fusion with additional virtual sensor data that may be different than the virtual sensor data involved in context fusion used in the base layer for level 2 context fusion. As such, Context$_3$ may be formed from the fusion of Context$_2$ with virtual sensor data or context information. Thus, the example embodiment of FIG. 4 performs audio based context extraction via the sensor processor 78.

As may be appreciated, the embodiment of FIG. 4 may result in less loading of the processor 70, since all physical sensor data is extracted, pre-processed and fusion of such data is accomplished by the sensor processor 78. Thus, for example, sensor preprocessing, context extraction, sensor management, gesture/event detection, sensor calibration/compensation and level 1 context fusion are performed in a dedicated, low power device, namely the sensor processor 78, which may enable continuous and adaptive context sensing.

FIG. 4 shows the high level architecture of the distributed context sensing system. The context extraction and fusion and fusion are performed by different entities/processors/processes in a distributed fashion or layered/linear way. A set of physical sensors 26, 501-505 are interfaced to a sensor processor 78 which can manage sensors, pre-processes sensor data and extract the first level of context and perform data level context fusion. The sensors themselves may perform a certain level of data abstraction or context extraction, and it can be called component level fusion. E.g. accelerometers 501, gyroscopes 505 and magnetometers 502 can give out an interrupt when certain predefined gestures are performed (wave, draw circle in the air, bring to focus . . . switching between a landscape/portrait mode).

The sensor processor 78 can use pre-processed data and context from other subsystems 520 which has some type of physical data source, e.g. a modem, a radio-frequency (RF) module, an audio-visual (AV) module, a positioning system receiver such as a receiver for the global positioning system (GPS), and perform a context fusion or the second level of context fusion can be performed in a virtual process having access to the physical data sources mentioned above.

As the main processor 70 itself may be a processor running an operating system (OS) the virtual context fusion processes 71 running in the main processor 70 may have access to the context and sensor data from the sensor processor 78, other subsystems with physical data source and virtual sensors, e.g. time, calendar events, alarm, profile, device state, battery state, application data, data from webservices etc.

It should be noted here that the virtual context fusion processes 71 may be implemented in the program code of the main processor 70 or they may be separate processors within the main processor 70. Each virtual context fusion process 71 may be assigned a dedicated area from the memory 40, 42 of the device 10 for storing data, for example.

FIG. 5a shows one embodiment of the system implementation architecture. All of the sensors including a microphone 26 are interfaced to the sensor processor 78. Level 1 or the data level context extraction and fusion are performed in the sensor processor 78 and context information is communicated to the processor 70 when it is requested or when a change of event occurs. The level 2 context fusion in the base layer or feature level fusion which involves the basic context and virtual sensors may create context information with a time stamp. The middleware has the level 3 context fusion process. As explained earlier, it performs context fusion with virtual sensors which could be different from the ones used in the base layer.

Figure 5B:
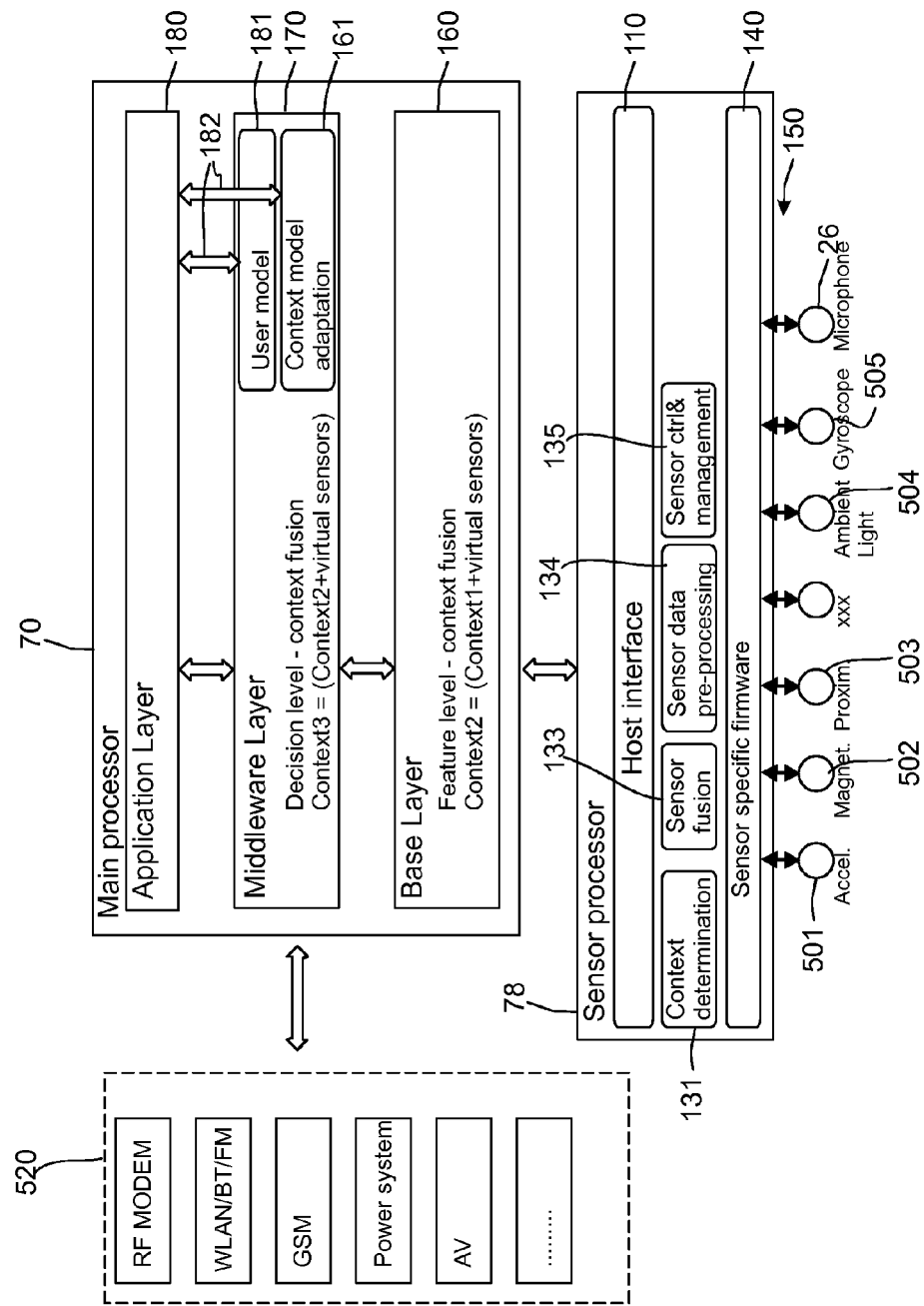
FIG. 5b illustrates another implementation architecture for providing context determination and context model adaptation according to an example embodiment.

FIG. 5b shows another embodiment of the system implementation architecture. All of the sensors including a microphone 26 are interfaced to the sensor processor 78. In this embodiment the sensor processor 78 communicates context information without further processing to the middleware layer, possibly via the base layer. Then, the level 1 or the data level context extraction and fusion are performed in the middleware layer. Further, the level 2 context fusion and the level 3 context fusion are also performed in the middleware layer.

In yet another embodiment the level 1 context extraction and fusion as well as the level 2 context fusion are performed in the middleware layer, but the level 3 context fusion is performed in the application layer.

Hence, the levels 1 to 4 and the layers of the system architecture need not be tied together but the software layers 1 to 4 can be implemented in various software layers in different embodiments.

Below a few examples of how to perform adaptation on the architecture are shown, with reference to FIG. 6. The examples are given in increasing order of complexity and performance.

It is noted that optionally the system may have a mode for enabling the adaptation. Thus, when adaptation is on, the system attempts to adapt the models in one or more layers of the system. If the adaptation mode is off, no adaptation is done. The trigger for enabling adaptation mode may come e.g. as user input, or from additional logic. For example, if an additional logic indicates that overall context determination reliability is low, then the adaptation mode may be enabled. For example, the additional logic might examine a predetermined number of previous context classifications and examine their reliability. If the reliability is low for a predetermined number of successive steps, it may enable the adaptation mode.

In the following example four levels for processing sensor data for environment and activity classification for context adaptation are disclosed. The first level is called as a sensor processor layer, the second level is called as a base layer 160, the third level is called as a middleware layer 170, and the fourth level is called as an application layer 180. However, it should be noted that in different embodiments the levels may differ from the above. For example, in some embodiments some of the above mentioned levels are not existing whereas in some other embodiments there may be more than four levels.

The term context determination is used to describe environment and activity classification but it may also include classifications of other contexts, e.g. the user context and/or the device context.

When the device 10 is operating, sensors may provide sensor data through the hardware interface 150 to sensor specific firmware modules 140 in which the sensor data may be converted to a form appropriate for the sensor processor 78. In some embodiments the data conversion may include analog to digital conversion to form a digital representation of the analog sensor data and sampling the digital representation to form sensor data samples. Sensor data samples may be stored into a memory or they may be provided directly to the management module 120 and/or to the fusion core 130. The sensor processor 78 thus collects sensor data from the sensors and the sensor data pre-processing module 134 may pre-processes the sensor data, when necessary.

When the context sensing module 131 performs the environment and activity classification it may use sensor data from one or more sensors and corresponding context models. For example, the context sensing module 131 may use audio data captured by the microphone to determine in which kind of environment the device 10 is located. The context sensing module 131 may use another sensor data to determine the current activity of the user of the device 10. For example, the context sensing module 131 may use the accelerometer data to determine whether the user is moving, e.g. running, cycling or sitting, It is also possible that two or more different kinds of sensor data is used to evaluate similar context types, e.g. whether the user is indoors or outdoors, sitting in a bus or train etc.

The context sensing module 131 performs feature extraction on the basis of sensor data. Details of the feature extraction depend inter alia on the type of sensor data. As an example, if the sensor data is accelerometer data the extracted features may include acceleration value or a change in the acceleration value. In case of proximity data the extracted feature data may include distance values or a difference between distance values of a previous distance and the current distance. In case of audio data the extracted features may be provided in the form of a sequence of Mel-frequency cepstral coefficient (MFCC) feature vectors, for example. It should be noted, however, that the above mentioned features are only non-limiting examples of results the feature extraction may produce but also other kind of features may be produced as well.

The data obtained by the feature extraction, i.e. the extracted features, is also being called as adaptation data in this application.

When the features have been extracted the context sensing module 131 may use context models stored. e.g. in the context model database 116 (FIG. 7) and the adaptation data obtained by the feature extraction to evaluate, for example, a list of probabilities for different environment and/or activity alternatives. In some embodiments the same sensor data may be used with different context models so that probabilities for different environments/activities can be obtained. The context sensing module 131 may examine the list of probabilities to determine whether it is possible to conclude the environment and/or the activity with high enough confidence or not. In one embodiment the probabilities (confidence values) of two most probable contexts in the list are compared with each other and if the difference between these two values is high enough i.e. greater than a first threshold, the context sensing module 131 may determine that the context has been determined with high enough confidence. In another embodiment the context sensing module 131 evaluates the value of the highest probability in the list of probabilities to determine whether the probability is high enough or not. Therefore, the value of the most probable context may be compared with a second threshold to determine how confident the most probable context is. In a still further embodiment both of the above mentioned criteria may be used i.e. is the highest probability high enough and is the difference large enough.

If the context sensing module 131 concludes that the context could be determined with high enough confidence, the context sensing module 131 provides indication of the context i.e. a label of the context and corresponding extracted features to the adaptation module 132 for context model adaptation. The adaptation module 132 uses the extracted features in adapting the corresponding context model. The adapted context model may be stored in the context model database 117.

In some situations it may occur that the context sensing module 131 can only conclude the context partially i.e. the environment or the activity with high enough confidence but not both of them. In one embodiment the context sensing module 131 may then leave the decision of both the environment and the activity to higher levels. In another embodiment the context sensing module 131 uses that part of the context determination (e.g. the environment or the activity) which the context sensing module 131 could determine confidently and leaves the decision of the other part(s) of the context determination to higher levels.

The sensor fusion module 133 may fuse data from different sensors. Hence, the context sensing module 131 may also use the fused data in the context determination process and/or the fused data may be provided to higher levels.

If the context sensing module 131 determines that it could not conclude the context the context sensing module 131 passes the adaptation data and possibly information on the corresponding context to the second level. The second level includes the base layer 160 of the operating system layers. These operating system layers may also be called as host-os layers.

On the second level the adaptation data which may include the extracted features from one or more sensors are used to determine the environment and activity classification. Similarly to the sensor processor layer classification, the environment and activity classification may produce a list of probabilities or some other information indicating for one or more contexts (environment/activity) the probability that the context corresponds with the real context of the device. The base layer 160 may then determine whether the classification produced an indication of the context which is confident enough. In that case the adaptation data and the labels from the classification are used to adapt the corresponding context models e.g. environment and activity models. The base layer 160 may include the adaptation module 161 for the adaptation wherein the obtained models are passed back to the sensor processor 78 which may store the updated context models to the context model database 117. In some embodiments the base layer 160 provides the adaptation data to the sensor processor 78 in which the adaptation module 132 may adapt the context model and store the adapted context models to the context model database 116.

If the base layer 160 determines that it could not conclude the context or parts of it reliably, the base layer 160 may pass the classification results to the third level, which in this example is the middleware layer 170. The middleware layer 170 may perform decision level fusion based on the environment and activity classification results. In other words, the middleware layer 170 may combine some virtual sensor data with the adaptation data from lower layers to improve the accuracy of the context determination. Namely, in some embodiments the fusion of the environment and activity classifications may perform better than separate classifications. When the classification have been successful, the labels obtained from the fusion are passed back to the base layer, which performs the adaptation of the context models. The obtained models are passed back to the sensor processor 78 to store the updated context models to the context model database 117.

On the other hand, if the classification was not successful, the classification results of the middleware layer 170 are then passed to the fourth level, which in this example embodiment is the application layer 180. In the application layer 180, a joint prior virtual sensor can be used to try to extract more accurate classification results. Alternatively, the user can provide the correct label(s). For example, the application layer 180 forms a message on the display 28 to ask the user to select the correct environment and/or activity. The data entered by the user is passed to the application layer 180 wherein the application layer may determine correct labels on the basis of the user data. The labels obtained from the application layer 180 are passed back to the base layer 160, which performs the adaptation of the context models. The obtained models are passed back to the sensor processor 78, as the sensor processor may be capable of sending, receiving and updating the context models on the fly without pausing and rebooting the normal activities of the processor.

In some embodiments, as is illustrated with arrows 182 in FIG. 5b, the application layer may be provided with an interface to the user model 181 and the adaptation module 161 which may be implemented in the middleware layer 160 or in another layer. The application layer or an application running under the control of the operating system of the device 10, may then have access to the user model and by examining the user model and the adaptation data, may perform a kind of a classification to determine some probabilities to different contexts. Then, the application layer may display some alternatives of possible context on the display so that the user may then select the context which he regards the most correct one, or the user may select another context. For example, the user may exceptionally be in a context in which he has not been previously. Thus, the user model 181 may be adapted accordingly.

In some embodiments the application layer provides the user indicated context label to the adaptation module which performs the adaptation of the context model(s) and/or the user model(s).

the context. In that case the layer which shifts the determination may still provide parameters to the higher level. For example, if the system is configured to operate so that the sensor processor 78 do not try to determine the context, the sensor processor 78 extracts features from sensor data, may perform context fusion, and passes the extracted features and other possible adaptation data to the base layer 160.

In some embodiments the system also comprises a user model 181 which contains information regarding user habits, preferences etc. The user model may be based on a default user model which may be adapted during the use of the device 10. For example, when the context classification has determined a current context and performs the context model adaptation if necessary, the user model may be updated or adapted so that the current context is taken into account. For example, if the user model revealed before the context determination that there is only a small probability that the user is running outdoors, but the current context revealed that the user actually is running outdoors, the probability of such a context might be increased in the user model.

In the following some details of the utilization of the user model 181 on the application layer will be disclosed in more detail. However, if the user model is in use, it may also be utilized on other layers, not only on the application layer. In some embodiments the user model is utilized on each layer where the context determination will be performed. In another embodiment the user model is not utilized on application layer but on one or more other layers where the context determination will be performed.

When the context determination is made on the application layer and the user model 181 is in use on this layer, the context determination process may provide classifications for different environments and activities. Therefore, different combinations of the environment and activity may have different probabilities. The user model may include information on the probabilities for different environment/activity combinations for that particular user. Table 1 shows an example of probabilities of the joint occurrence of environments and activities. The environment and activity probabilities obtained from the environment and activity recognizers are multiplied with the corresponding probability to give a joint environment/activity probability. The environment/activity-pair that gives the maximum joint probability is chosen as the output from the system.

TABLE 1

|  | car/bus | home | mee/lec | off | out | res/pub | sho | str/roa | tra/met |
|---|---|---|---|---|---|---|---|---|---|
| Idle/still | 0.00 | 0.25 | 0.06 | 0.27 | 0.01 | 0.03 | 0.02 | 0.01 | 0.00 |
| Walk | 0.00 | 0.01 | 0.00 | 0.01 | 0.02 | 0.01 | 0.01 | 0.02 | 0.00 |
| Run | 0.00 | 0.00 | 0.00 | 0.00 | 0.01 | 0.00 | 0.01 | 0.01 | 0.00 |
| Train/metro/tram | 0.00 | 0.00 | 0.00 | 0.00 | 0.00 | 0.00 | 0.00 | 0.00 | 0.01 |
| Car/bus/motorbike | 0.04 | 0.00 | 0.00 | 0.00 | 0.00 | 0.00 | 0.00 | 0.00 | 0.00 |
| Bicycle | 0.00 | 0.00 | 0.00 | 0.00 | 0.00 | 0.00 | 0.00 | 0.01 | 0.00 |
| Skateboard | 0.00 | 0.00 | 0.00 | 0.00 | 0.01 | 0.00 | 0.00 | 0.01 | 0.00 |

As the examples above indicate, in some embodiments the computationally more expensive adaptation can be performed on the operating system layers than the sensor processor.

Although it was mentioned above that each layer may examine whether they can determine the context correctly or not, in some embodiments some of the layers may shift the determination to a higher level without trying to conclude In this example, the environments $E_i$, $i=1, \ldots, 9$, are car/bus, home, meeting/lecture, office, outdoors, restaurant/pub, shop, street/road, and train/metro. The activities $Y_j$, $j=1, \ldots, 7$, are idle/still, walking, running, train/metro/tram, car/bus/motorbike, bicycling, and skateboarding. As another example, instead of probabilities, the values of $p_{ji}$ can either be ones or zeros, representing only which environment-activity pairs are allowed.

When the user model is adapted, the adaptation may be directed to the selected context or also to some other elements of the user model but it may not be reasonable to update elements for which the indicated probability was zero or a very low value. For example, in Table 1 those values which are zeros do not necessarily indicate that a corresponding combination of environment and activity is not possible for that user but it may indicate that it is very probable that the current context is not such a combination.

In some embodiments the user model and/or the adapted context models may be stored to a memory of the device 10, to an external memory, to an external service such as the OVI® service provided by Nokia Corporation, etc. Then, the stored user model and/or the adapted context models may be downloaded to the same device 10 or to a different device. For example, if the user purchases a new mobile phone, phone configurations, personal settings, contacts, the user model and the context models of the user can be moved to the new device and taken in use wherein the new device may already be adapted to the user's habits and behaviour and the adaptation need not be started from the default models.

The same device 10 may also include user models and context models of different users. Then, the user who is starting to use the device 10, may input his/her user id to the device, e.g. the PIN code (personal identification number). Hence, the device 10 searches from e.g. the memory of the device or from an external service the user model and context models of that particular user and starts to use them.

The adaptation of the user and context models may be continuous or non-continuous. Continuous adaptation means in this application that the device uses the sensor data and performs the adaptation while the device is operating. The adaptation may be without or with user interference. Non-continuous adaptation means that the adaptation is performed when requested e.g. by the user or by an application running in the device 10.

The choice of which of the above cases would be used for adaptation could be done automatically. An estimate of how confident the system is in the adaptation the labels can be estimated at each case as was shown above. In other words, if the system is confident that the label at any of the levels is correct, the system may perform the adaptation based on the label determined at that level. If the system is not confident in the label, the next level is used. It is possible that the labels are more and more likely to be correct as the level goes up.

In the following an example of one possible way of adapting the model parameters of the environment models is described. Similar methods can be used for the adaptation of activity and other models as well. In addition to the "Maximum a Posteriori (MAP)" adaptation explained here, several other methods are available for doing adaptation, such as "Maximum Likelihood Linear Regression" (MLLR) and "Maximum a Posteriori Linear Regression" (MAPLR).

In one embodiment, the system performs adaptation of the audio-based environment models. As features, the system uses a mel-frequency cepstral coefficient (MFCC) front-end which outputs 13 cepstral coefficients and their 1st and 2nd order derivatives. The MFCCs are calculated from 16 kHz audio data using a window of 480 samples or 30 ms per frame and a frame shift of 40 ms.

The acoustic models used in the system are quantized Gaussian Mixture models (qGMMs). Quantized Gaussian mixture models are created starting from Gaussian mixture models (GMM) by applying a scalar quantization on the mean and variance parameters. Two quantizers are built, one for the mean parameters and one for the variance parameters. Quantizing the model parameters, if certain conditions hold, allows for faster probability calculation during recognition compared to continuous density models.

In one embodiment, the system receives adaptation data in the form of a sequence of MFCC feature vectors and a label (or labels) specifying the environment the adaptation data was recorded in. The adaptation data and the label is passed to the adaptation stage. The adaptation stage then modifies (adapts) the model parameters corresponding to the label to better fit the adaptation data, or passes the adaptation data to a next level if the context could not be determined accurately enough on that level.

The adaptation can be performed using, for example, maximum a posteriori (MAP) adaptation. MAP adaptation is performed by first creating a network of the models corresponding to the label(s). The network is essentially a hidden Markov model (HMM) with the environment GMMs of the labels in parallel. The network may also contain only a single environment GMM that has been indicated by the user to be the true, current environment. Then, using the forward-backward or the Viterbi algorithm, the occupation probabilities of the Gaussian mixture components of the network are calculated for the adaptation data. These probabilities are then used to obtain the adapted parameter values.

Thus, the network comprises J Gaussian mixture models, indexed by j=1, . . . , J. Each Gaussian mixture model is parameterized by the mean vectors $\mu_{jm}$, covariance matrices $\Sigma_{jm}$, and mixture weights $w_{jm}$, m=1, . . . , M, where M denotes the number of Gaussians in the GMMs. The parameter M may have different values for different models.

MAP adaptation for the mean parameter of mixture component m of state j is done using the following formula $$\hat{\mu}_{jm} = \frac{N_{jm}}{N_{jm} + \tau}\bar{\mu}_{jm} + \frac{\tau}{N_{jm} + \tau}\mu_{jm} \quad (1)$$

where $\mu_{jm}$ is the unadapted mean, $\tau$ is an adaptation weight and $N_{jm}$ is the occupation likelihood of the adaptation data and $\bar{\mu}_{jm}$ is the observed mean of the adaptation data:

$$N_{jm} = \sum_{t=1}^{T} L_{jm} \quad (2)$$

$$\bar{\mu}_{jm} = \frac{\sum_{t=1}^{T} L_{jm}(t)o_t}{\sum_{t=1}^{T} L_{jm}(t)} \quad (3)$$

where $L_{jm}(t)$ is the occupation probability for mixture component m of model j at time t, $o_t$ is the tth feature vector and T is the length of the sequence of feature vectors. $L_{jm}(t)$ can be calculated using the forward-backward or the Viterbi algorithm. In theory, the mixture weights and covariances of the models could be adapted using MAP. In practice, however, this is usually not done due to the small amount of adaptation data available.

As mentioned earlier in this application, the adaptation uses the adaptation data and a label describing the class of the adaptation data. The label can be obtained either in a supervised or unsupervised manner. By supervised it is meant that the user of the system provides the (correct) label. The unsupervised case means that first the classification is performed on the adaptation data and then the classification result is used as the label. In general, supervised adaptation may perform better, but user input is needed.

In some embodiments the context sensing module 131 may use only some of the sensors to perform context determination and pass the extracted features or other sensor data to higher levels for context determination and adaptation.

A specific example will now be described for purposes of explanation and not of limitation in reference to FIG. 6. FIG. 6 illustrates an example of device environment and user activity sensing and context model adaptation based on audio and accelerometer information according to an example embodiment. However, several other device environments could alternatively be employed.

Figure 6:
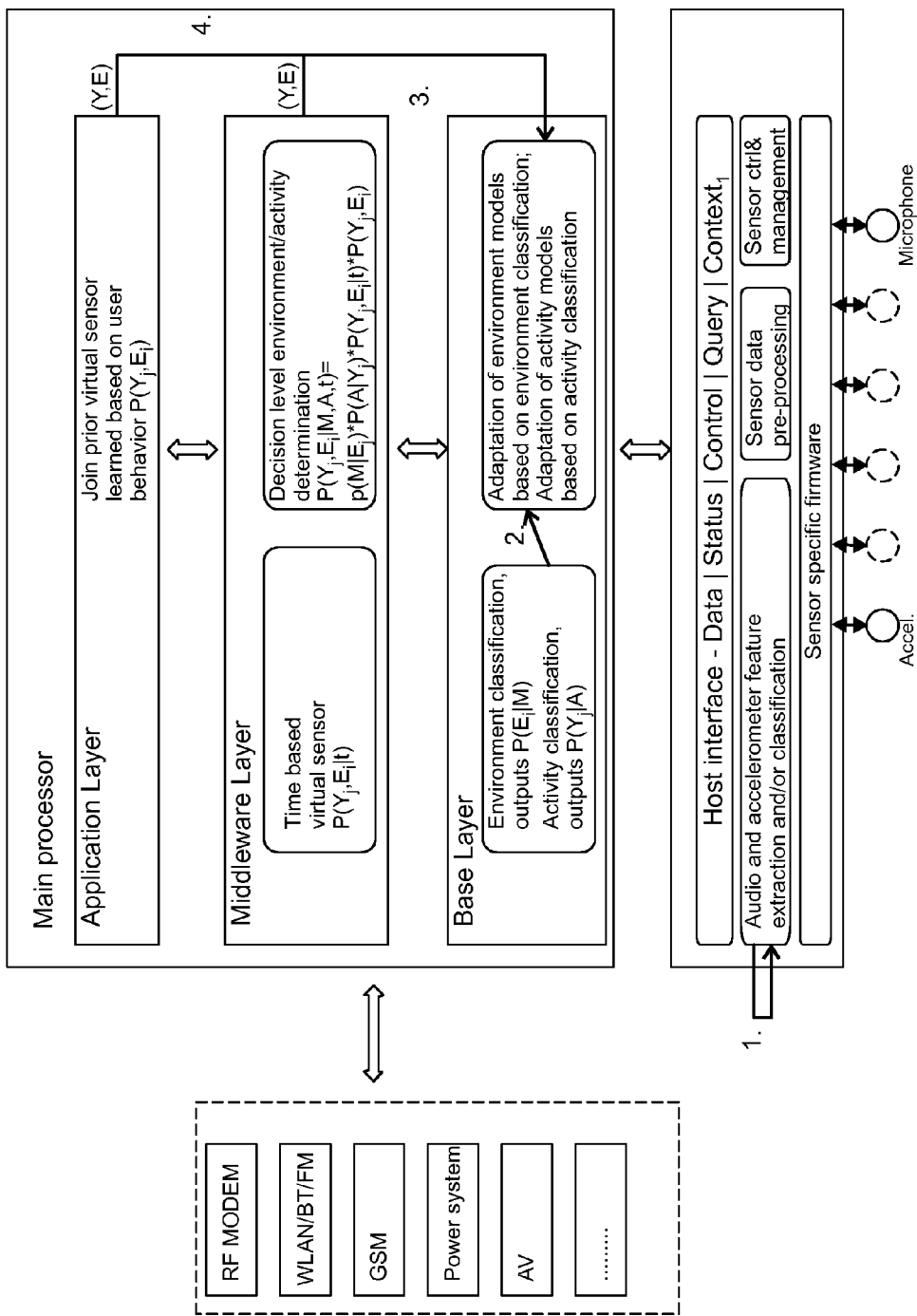
FIG. 6 illustrates an example of device environment and user activity sensing based on audio and accelerometer information according to an example embodiment.

As shown in FIG. 6, audio-context extraction may be implemented with any of various methods. In one example, which is described below to illustrate one possible series of processing operations that the sensor processor 78 may employ, an acoustic signal captured by the microphone 26 may be digitized with an analog-to-digital converter. The digital audio signal may be represented (e.g. at a sampling rate of 8 kHz and 16-bit resolution) as frames. Features may then be extracted from the audio signal (e.g., by extracting and windowing frames of the audio signal with a frame size of 30 ms, corresponding to 240 samples at 8 kHz sampling rate). Adjacent frames may have overlap in some cases or, in other cases, there may be no overlap at all and there may instead be a gap between adjacent frames. In one example, the frame shift may be 50 ms. The frames may be windowed with a hamming window and, in some examples, may be zero-padded. After zero-padding, the frame length may be 256. A Fast Fourier Transform (FFT) may be taken of the signal frames, and its squared magnitude may be computed. The resulting feature vector in this example represents the power of various frequency components in the signal. Further processing may be done for this vector to make the representation more compact and better suitable for audio-environment recognition. In one example, mel-frequency cepstral coefficients (MFCC) are calculated. The MFCC analysis involves binning the spectral power values into a number of frequency bands spaced evenly on the mel frequency scale. In one example, 40 bands may be used. A logarithm may be taken of the band energies, and a discrete cosine transform (DCT) may be calculated of the logarithmic band energies to get an uncorrelated feature vector representation. The dimensionality of this feature vector may be, for example, 13. In addition, first and second order time derivatives may be approximated from the cepstral coefficient trajectories, and appended to the feature vector. The dimension of the resulting feature vector may be 39.

Meanwhile, the sensor processor 78 may also implement feature extraction for the accelerometer signal 501. The raw accelerometer signal may be sampled (e.g., at a sampling rate of 100 Hz) and may represent the acceleration into three orthogonal directions, x, y, z. In one embodiment, feature extraction starts by taking a magnitude of the three dimensional acceleration, to result in a one-dimensional signal. In another example embodiment, a projection onto a vector is taken of the accelerometer signal to obtain a one-dimensional signal. In other embodiments, the dimensionality of the accelerometer signal subjected to feature extraction may be larger than one. For example, the three-dimensional accelerometer signal could be processed as such, or a two-dimensional accelerometer signal including two different projections of the original three-dimensional accelerometer signal could be used.

Feature extraction may, for example, comprise windowing the accelerometer signal, taking a Discrete Fourier Transform (DFT) of the windowed signal, and extracting features from the DFT. In one example, the features extracted from the DFT include, for example, one or more spectrum power values, power spectrum centroid, or frequency-domain entropy. In addition to features based on the DFT, the sensor processor 78 may be configured to extract features from the time-domain accelerometer signal. These time-domain features may include, for example, mean, standard deviation, zero crossing rate, 75% percentile range, interquartile range, and/or the like.

Various other processing operations may also be performed on the accelerometer data. One example includes running a step counter to estimate the step count and step rate for a person. Another example includes running an algorithm for step length prediction, to be used for pedestrian dead reckoning. Yet another example includes running a gesture engine, which detects a set of gestures, such as moving a hand in a certain manner. Inputs related to each of these processing operations may also be extracted and processed for context fusion as described in greater detail below in some cases.

After extraction of the audio and accelerometer feature data by the sensor processor 78, the sensor processor 78 may pass the corresponding audio features M and accelerometer features A to the processor 70 for context fusion involving virtual sensor data. Base layer audio processing according to one example embodiment may include communication of the MFCC feature vectors extracted above from the sensor processor 78 to the base layer 160 of the processor 70 to produce a set of probabilities for audio context recognition. In some cases, to reduce the data rate communicated to the processor 70, the processor 70 may read raw audio data, e.g., using a single channel audio input running at 8000 kHz sampling rate and 16-bit resolution audio samples, to correspond to a data rate of 8000*2=16000 bytes/s. When communicating only the audio features, with a frame skip of 50 ms, the data rate would become about 1000/50*39*2=1560 bytes/s (assuming features represented at 16-bit resolution).

In some optional cases, a form of feature level fusion may be employed in the base layer. For example, features produced by another sensor, such as an accelerometer or illumination sensor, could be appended to the MFCC features, and used to generate the probabilities for environments $E_i$.

In one example embodiment, processing of accelerometer data at the base layer may include receiving a feature vector from the sensor processor 78 at regular time intervals (e.g., every 1 second). Upon receiving the feature vector, the base layer may perform classification on the accelerometer feature vector. In one embodiment, activity classification may be performed using the accelerometer feature vector. This can be implemented in some examples by training a classifier, such as a k-Nearest neighbors or any other classifier, for a set of labeled accelerometer data from which features are extracted. In one embodiment, a classifier is trained for classifying between running, walking, idle/still, bus/car, bicycling, and skateboarding activities. The activity classifier may produce probabilities $P(A|Y_j)$ for the set of activities $Y_j$, j=1, ..., M. A may include at least one feature vector based on the accelerometer signal. In the case of the k-Nearest neighbors classifier, the probability for activity $Y_i$ may be calculated as, for example, a proportion of samples from class $Y_i$ among the set of nearest neighbors (e.g. 5 nearest neighbors). In other embodiments, various other classifiers may be applied, such as Naïve Bayes, Gaussian Mixture Models, Support Vector Machines, Neural Networks, and so on.

The software implemented on the middleware may receive various hypotheses from the base layer, and may perform decision level fusion to give a final estimate of the context. In one embodiment, the middleware receives a likelihood for the environment based on the audio features $p(M|E_i)$, a probability for the activity based on the accelerometer data $P(A|Y_j)$, and forms a final hypothesis of the most likely environment and activity pair given the sensory hypotheses and one or more virtual sensors. In some embodiments, an example virtual sensor input may be a clock input so that a time prior may be included in the determination regarding the likely environment. The time prior may represent the prior likelihoods for environments, activities, and/or their combinations for this particular user.

As another example, prior information may be incorporated to the decision in the form of a virtual sensor. The prior information may represent, for example, prior knowledge of the common occurrence of different activities and environments for this user. More specifically, the prior information may output a probability $P(Y_j, E_i)$ for each combination of environment $E_i$ and activity $Y_j$. The probabilities may be estimated using information on common environments and activities collected from the user in the application layer, and communicated to the middleware.

In one embodiment, the middleware may perform decision level data fusion by selecting the environment and activity combination which maximizes the equation $P(Y_j, E_i|M,A,t)=p(M|E_i)*P(A|Y_j)*P(Y_j,E_i|t)*P(Y_j,E_i)$, where $P(Y_j, E_i|t)$ is a probability for the environment and activity combination from the time prior. This may be communicated further to the application layer. It can be noted that maximizing the above equation can also be done by maximizing the sum of the logarithms of the terms, that is, by maximizing log $[p(M|E_i)]$+log $[P(A|Y_j)]$+log $[P(Y_j,E_i|t)]$+log $[P(Y_j, E_i)]$, where log is e.g., the natural logarithm.

Figure 7:
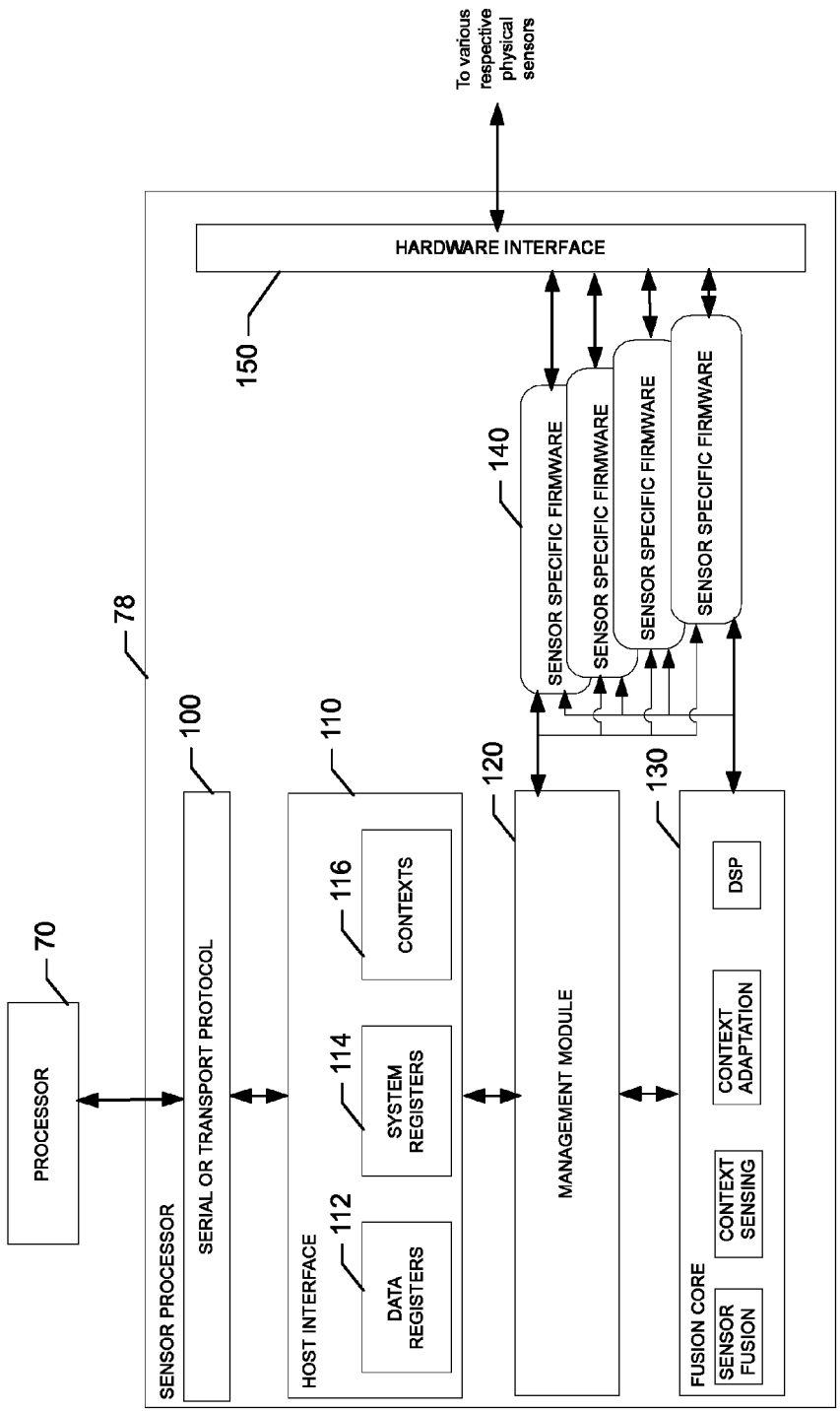
FIG. 7 illustrates an example microcontroller architecture for a sensor processor according to an example embodiment.

FIG. 7 illustrates an example microcontroller architecture for the sensor processor 78 according to an example embodiment. As shown in FIG. 7, the sensor processor 78 may include a communication protocol defining an interface with the processor 70. In some cases, the communication protocol could be a serial or transport protocol 100 to interface with the processor 70. The sensor processor 78 may also include a host interface (e.g., a register mapped interface) 110 including data registers 112 (e.g., proximity, light, feature vectors, etc.), system registers 114 (e.g., sensor control, sensor status, context control, context status, etc.) and a list of corresponding contexts 116 (e.g., environmental, activity, user, orientation, gestures, etc.). The sensor processor 78 may also include a management module 120 to handle event management and control and a fusion core 130 to handle sensor pre-processing, various hardware accelerated signal processing operations, context sensing and/or sensor fusion operations and context adaptation with corresponding algorithms. As such, the fusion core 130 may include submodules such as, for example, a sensor fusion module, a context sensing module, a context adaptation module 132, a DSP, etc. The sensor processor 78 may also have a kernel which is capable of the task scheduling and management to meet the real time needs. The management module 120 and the fusion core 130 may each be in communication with sensor specific firmware modules 140 and a hardware interface 150 through which communications with the hardware of each of the physical sensors are passed.

Accordingly, some example embodiments may employ a single interface to connect an array of sensors to baseband hardware. High speed 12C/SPI serial communication protocols with register mapped interface may be employed along with communication that is INT (interrupt signal) based. Moreover, the host resources (e.g., the main processor) may only be involved to the extent needed. Thus, some embodiments may provide for relatively simple and lean sensor kernel drivers. For example, embodiments may read only pre-processed sensor data and events and provide sensor architectural abstraction to higher operating system layers. No change may be required in kernel drivers due to sensor hardware changes and minimal architectural impact may be felt in middleware and higher operating system layers. In some embodiments, the sensor processor may deliver preprocessed data to the host. This may be characterized by a reduction in data rate and reduced processing in the host engine side while unit conversion, scaling and preprocessing of sensor data can be performed at the microcontroller level. Specialized/complex DSP algorithms may be performed on sensor data in the microcontroller level to support close to real time sensor and event processing. Sensor data may therefore be processed at higher data rates with faster and more accurate responses. In some cases, host response time may also be more predictable.

In some embodiments, improved energy management may also be provided in the subsystem level. For example, sensor power management may be done in the hardware level and a sensor control and manager module 135 may optimize sensor on/off times to improve performance while saving power. Continuous and adaptive context sensing may also be possible. Context sensing, context model adaptation, event detection, gestures determining algorithms, etc., may be enabled to run continuously using less power than running in the host engine side. Thus, adaptive sensing for saving power may be feasible. In some embodiments, event/gesture detection may be performed at the microcontroller level. In an example embodiment, accelerometer data may be used to perform tilt compensation and compass calibration. Context extraction, context model adaptation and continuous context sensing may therefore be feasible in a variety of contexts. For example, environmental context (indoor/outdoor, home/office, street/road, etc.), user context (active/idle, sitting/walking/running/cycling/commuting, etc.) and terminal context (active/idle, pocket/desk, charging, mounted, landscape/portrait, etc.). Context confidence index may therefore be increased as the context propagates to upper operating system layers and when further context fusion with virtual sensors is done. Thus, for example, attempts to determine the current context or environment of the user, which may in some cases be used to enhance services that can be provided to the user, may be more accurately determined wherein the context adaptation may also be done more accurately and more probably focused to the correct context module. As a specific example, physical sensor data may be extracted to indicate that the user is moving in a particular pattern, and may also indicate a direction of motion and perhaps even a location relative to a starting point. The physical sensor data may then be fused with virtual sensor data such as the current time and the calendar of the user to determine that the user is transiting to a particular meeting that is scheduled at a corresponding location. Thus, by performing sensor data fusion, which according to example embodiments can be done in a manner that does not heavily load the main processor, a relatively accurate determination may be made as to the user's context.

FIG. 8 is a flowchart of a method and program product according to example embodiments. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, a method according to one embodiment, as shown in FIG. 8, may include receiving physical sensor data extracted from one or more physical sensors at operation 800. Features of the sensor data may be extracted at operation 801. The method may further include performing context fusion of the physical sensor data at the sensor processor level at operation 802. In an example embodiment, the method may further include determining (or enabling a determination to be made as to) at the sensor processor layer a context associated with a device in communication with sensors providing the physical sensor data based on a result of the context fusion at operation 804. In some embodiments at least one condition is evaluated at operation 806. For example, the condition may consider whether the context classification is reliable enough. If it was determined that the context classification was reliable the context model regarding the classified context and sensor data is adapted at operation 808. If it was determined that the context classification was not reliable or if the context classification was not performed at the sensor processor layer, the adaptation data is provided to the base layer 160 at operation 810. In some embodiments, the base layer may receive sensor data from one or more virtual sensors at operation 811 and perform context fusion of the received adaptation data and received virtual sensor data at operation 812.

Several different conditions for determining whether to proceed to higher layers are possible at operation 806. Determining whether the context classification is reliable enough is one example, and this can be accomplished e.g. by comparing the likelihood difference of the most likely context to the likelihood of the second most likely context and determining whether it exceeds a predefined threshold. Another possible condition at operation 806 relates to the availability of other sensors at higher layers in the system. If there are no additional sensors available in the higher layers that would provide additional information for this context (e.g. environment or activity), then it may not be useful to proceed to higher layers. As an example, if the activity context is recognized with the accelerometer signal and the system detects that the GPS sensor is not on, it may determine the activity based on the accelerometer signal alone at the first level. However, if the GPS sensor is on, it may provide further information such as the speed which is likely to improve the reliability of the activity classification. Yet another possible condition at operation 806 relates to the available power budget of the device. If the device is set to a mode where energy preservation is important, such as when running at low battery, it may be better to execute adaptation at the lowest layer possible than to proceed to higher layers. In other words, the power budget may set some limitations or restrictions to the execution of the adaptation with respect to the use of the second or higher level context determinations.

In an example embodiment, the method may further include determining at the base layer 160 a context based on a result of the context fusion (the adaptation data from the sensor processor layer and virtual sensor data) at operation 814. In some embodiments the reliability of the context classification is examined at operation 816. If it was determined that the context classification was reliable the context model regarding the classified context and sensor data is adapted at operation 818 and the adapted context model and the label indicating the context model is passed to the sensor processor layer for storing the adapted context model at operation 819. If it was determined that the context classification was not reliable or if the context classification was not performed at the base layer, the adaptation data is provided to the middleware layer 170 at operation 820. In some embodiments, the middleware layer may receive sensor data from one or more virtual sensors at operation 821 and perform context fusion of the received adaptation data and received virtual sensor data at operation 822.

In an example embodiment, the method may further include determining at the middleware layer 170 a context based on a result of the context fusion (the adaptation data from the base layer and virtual sensor data) at operation 824. In some embodiments the reliability of the context classification is examined at operation 826. If it was determined that the context classification was reliable indication of the context (e.g. the label) is provided to the base layer 160 for context model adaptation at operation 828. If it was determined that the context classification was not reliable or if the context classification was not performed at the middleware layer, the adaptation data is provided to the application layer 180 at operation 830. In some embodiments, the application layer may receive sensor data from one or more virtual sensors at operation 831 and perform context fusion of the received adaptation data and received virtual sensor data at operation 832.

In an example embodiment, the method may further include determining at the application layer a context based on a result of the context fusion (the adaptation data from the middleware layer and virtual sensor data) at operation 834. In some embodiments the reliability of the context classification is examined at operation 836. If it was determined that the context classification was reliable indication of the context (e.g. the label) is provided to the base layer 160 for context model adaptation at operation 828. If it was determined that the context classification was not reliable or if the context classification was not automatically performed at the application layer, the user of the device is asked to indicate the context at operation 838. The reply of the user indicative of the context is received at operation 840 and the indication is provided to the base layer 160 for context model adaptation at operation 828.

Figure 8A:
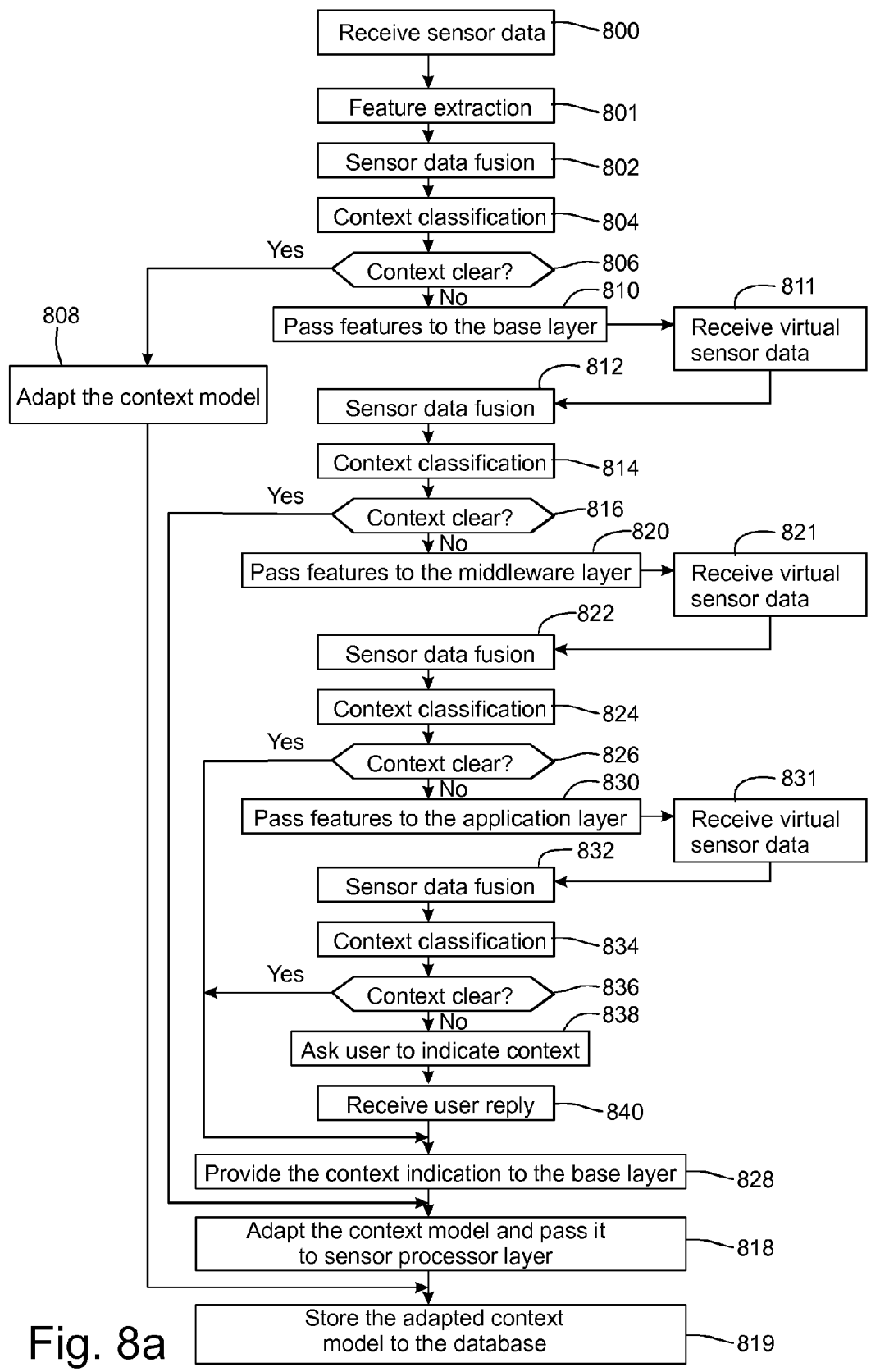
FIG. 8a is a flowchart according to an example method for providing context determination and context model adaptation according to an example embodiment.
Figure 8B:
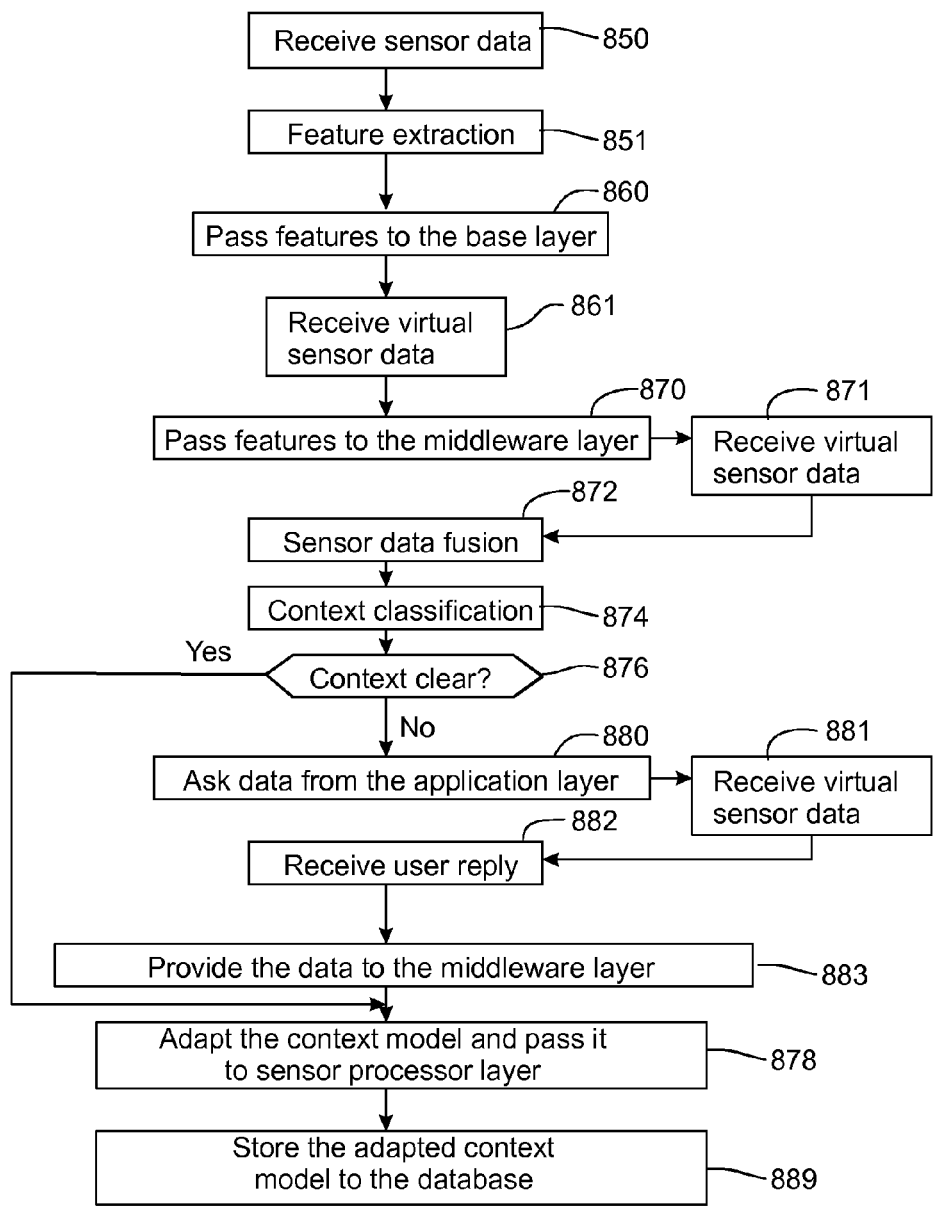
FIG. 8b is a flowchart according to another example method for providing context determination and context model adaptation according to an example embodiment.

FIG. 8*b* is a flowchart of a method and program product according to another example embodiment. As was explained above in connection with the description of the flow chart of FIG. 8*a*, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, a method according to one embodiment, as shown in FIG. 8*b*, may include receiving physical sensor data extracted from one or more physical sensors at operation 850. Features of the sensor data may be extracted at operation 851. The extracted data or, in some embodiments, the sensor data is provided to the base layer 160 at operation 860. In some embodiments, the base layer may receive sensor data from one or more virtual sensors at operation 861 and relay the received adaptation data and received virtual sensor data to the middleware layer at operation 870.

In some embodiments, the middleware layer may receive sensor data from one or more virtual sensors at operation 871 and perform context fusion of the received adaptation data and received virtual sensor data at operation 872.

In an example embodiment, the method may further include determining at the middleware layer 170 a context based on a result of the context fusion (the adaptation data from the base layer and virtual sensor data) at operation 874. In some embodiments the reliability of the context classification is examined at operation 876. If it was determined that the context classification was reliable indication of the context model is adapted accordingly at operation 878. If it was determined that the context classification was not reliable or if the context classification was not performed at the middleware layer, the middleware layer may ask more adaptation data from the application layer at operation 880. In some embodiments, the application layer may receive sensor data from one or more virtual sensors at operation 881 and/or information on the context from the user at operation 882. The application layer may then provide the adaptation data to the middleware layer at operation 883.

The adapted context model may be stored to the context model database at operation 899.

In an example embodiment, an apparatus for performing the method of FIGS. 8*a* and 8*b* above may comprise a processor (e.g., the processor 70) configured to perform some or each of the operations (800-844) described above. The processor may, for example, be configured to perform the operations (800-844) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 800-844 may comprise, for example, the processor 70, the fusion manager 80, and/or a device or circuit for executing instructions or executing an algorithm for processing information as described above. Many modifications and other embodiments set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
receiving sensor data extracted from one or more physical sensors;
using the extracted sensor data and a context model to perform a first level context determination;
examining, with a processor, at least one condition;
if the examining indicated that the at least one condition was fulfilled, adapting the context model on the basis of the sensor data without performance of another level of context determination, otherwise providing adaptation data formed on the basis of the sensor data to a second level context determination and using a combination of the extracted sensor data and virtual sensor data from virtual sensors configured to measure non-physical parameters to perform the second level context determination; and
in an instance that the at least one condition of the first level context determination and at least one condition of the second level context determination are fulfilled, adapting a same context model.

2. The method according to claim 1, wherein said at least one condition comprises at least one of
reliability of the context determination;
availability of further sensor data from another level to help context determination; or
an available power budget defining limitations to proceeding to said second level context determination or to a higher level context determination.

3. The method according to claim 1, wherein said first level context determination comprises:
receiving virtual sensor data from one or more virtual sensors at said first level; and
combining the virtual sensor data with the extracted sensor data to be used in said first level context determination.

4. The method according to claim 1, wherein said second level context determination comprises:

examining at least one condition of the second level context determination; and if the examining indicated that the at least one condition of the second level context determination was fulfilled, adapting the context model, otherwise providing adaptation data formed on the basis of the sensor data and virtual sensor data to a third level context determination.

5. The method according to claim 4, wherein said at least one condition of the second level context determination comprises at least one of reliability of the context determination;

availability of further sensor data from another level to help context determination; or an available power budget defining limitations to proceeding to said third level context determination or to a higher level context determination.

6. The method according to claim 4, wherein said third level context determination comprises:

examining at least one condition of the third level context determination; and if the examining indicated that the at least one condition of the third level context determination was fulfilled, adapting the context model, otherwise providing adaptation data formed on the basis of the sensor data and the virtual sensor data to a fourth level context determination.

7. The method according to claim 6, wherein said at least one condition of the third level context determination comprises at least one of reliability of the context determination;

availability of further sensor data from another level to help context determination; or an available power budget defining limitations to proceeding to said fourth level context determination or to a higher level context determination.

8. An apparatus comprising:

at least one processor;

and at least one memory including computer program code, the at least one memory and the computer program code configured to, with the at least one processor, cause the apparatus at least to receive sensor data extracted from one or more physical sensors;

use the extracted sensor data and a context model to perform a first level context determination; and examine at least one condition;

wherein the at least one memory and the computer program code are further configured to adapt the context model on the basis of the sensor data without performance of another level of context determination if the examining indicated that the at least one condition was fulfilled, otherwise to provide adaptation data formed on the basis of the sensor data to a second level context determination and using a combination of the extracted sensor data and virtual sensor data from virtual sensors configured to measure non-physical parameters to perform the second level context determination; and in an instance that the at least one condition of the first level context determination and at least one condition of the second level context determination are fulfilled, adapt a same context model.

9. The apparatus according to claim 8, wherein said at least one condition comprises at least one of reliability of the context determination;

availability of further sensor data from another level to help context determination; or an available power budget defining limitations to proceeding to said second level context determination or to a higher level context determination.

10. The apparatus according to claim 8, wherein the at least one memory and the computer program code are further configured to, with the at least one processor, cause the apparatus at least to:

receive virtual sensor data from one or more virtual sensors at said first level; and combine the virtual sensor data with the extracted sensor data to be used in said first level context determination.

11. The apparatus according to claim 8, wherein the at least one memory and the computer program code are further configured to, with the at least one processor, cause the apparatus at least to:

examine at least one condition of the second level context determination, and adapt the context model if the examining indicated that the at least one condition of the second level context determination was fulfilled, otherwise to provide adaptation data formed on the basis of the sensor data and virtual sensor data to a third level context determination.

12. The apparatus according to claim 11, wherein said at least one condition of the second level context determination comprises at least one of reliability of the context determination;

availability of further sensor data from another level to help context determination; or an available power budget defining limitations to proceeding to said third level context determination or to a higher level context determination.

13. The apparatus according to claim 11, wherein the at least one memory and the computer program code are further configured to, with the at least one processor, cause the apparatus at least to:

examine at least one condition of the third level context determination; and adapt the context model if the examining indicated that the at least one condition of the third level context determination was fulfilled, otherwise to provide adaptation data formed on the basis of the sensor data and the virtual sensor data to a fourth level context determination.

14. The apparatus according to claim 13, wherein said at least one condition of the third level context determination comprises at least one of reliability of the context determination;

availability of further sensor data from another level to help context determination; or an available power budget defining limitations to proceeding to said fourth level context determination or to a higher level context determination.

15. A computer program product comprising at least one non-transitory computer-readable storage medium having computer-executable program code portions stored therein, the computer-executable program code portions comprising program code instructions for:

receiving sensor data extracted from one or more physical sensors;

using the extracted sensor data and a context model to perform a first level context determination;

examining at least one condition;

if the examining indicated that the at least one condition was fulfilled, adapting the context model on the basis of the sensor data without performance of another level of context determination, otherwise providing adaptation data formed on the basis of the sensor data to a second level context determination and using a combination of the extracted sensor data and virtual sensor data from virtual sensors configured to measure non-physical parameters to perform the second level context determination; and in an instance that the at least one condition of the first level context determination and at least one condition of the second level context determination are fulfilled, adapting a same context model.

16. The computer program product according to claim 15, wherein said first level context determination comprises:
   receiving virtual sensor data from one or more virtual sensors at said first level; and
   combining the virtual sensor data with the extracted sensor data to be used in said first level context determination.

17. The computer program product according to claim 15, wherein said second level context determination comprises:
   examining at least one condition of the second level context determination; and
   if the examining indicated that the at least one condition of the second level context determination was fulfilled, adapting the context model, otherwise providing adaptation data formed on the basis of the sensor data and virtual sensor data to a third level context determination.

* * * * *